United States Patent [19]
Ikeda

[11] 3,932,037
[45] Jan. 13, 1976

[54] ORIGINAL HOLDER PLATE FOR COPYING MACHINE

[75] Inventor: Hiroshi Ikeda, Aichi, Japan

[73] Assignee: Minolta Camera Kabushiki Kaisha, Osaka, Japan

[22] Filed: Oct. 29, 1974

[21] Appl. No.: 516,307

[30] Foreign Application Priority Data
Nov. 17, 1974  Japan.............................. 49-132976

[52] U.S. Cl.................................. 355/76; 355/118
[51] Int. Cl.²................... G03B 27/62; G03B 27/04
[58] Field of Search......... 355/25, 76, 75, 118, 128, 355/8; 312/291, 139, 271; 220/255, 333

[56] References Cited
UNITED STATES PATENTS

| | | | |
|---|---|---|---|
| 1,517,669 | 12/1924 | Deane............................ | 355/118 X |
| 3,224,353 | 12/1965 | Jones.................................... | 355/94 |
| 3,615,134 | 10/1971 | Newcomb,.......................... | 355/75 |
| 3,630,620 | 12/1971 | Fackler............................... | 355/76 |
| 3,642,376 | 2/1972 | Halvorsen et al................... | 355/128 |
| 3,655,283 | 4/1972 | Margulis et al...................... | 355/14 |
| 3,813,161 | 5/1974 | Curtis.................................. | 355/75 |

OTHER PUBLICATIONS
IBM Technical Disclosure Bulletin, "Document Hold-Down Device," Berliner et al., Vol. 13, No. 11, Apr. 1971, p. 3503.

*Primary Examiner*—Richard A. Wintercorn
*Attorney, Agent, or Firm*—Armand G. Guibert; Milton M. Wolson

[57] ABSTRACT

An original document holder for application in electrophotographic copiers of the instantaneous exposure type which use high intensity xenon flash lamps. The holder is a box-shaped cover with at least one movable, spring-closed side such that extra large, thick documents such as books may be copied without danger of light leakage by virtue of light-tight engagement of the movable side with the projecting portions of such documents.

8 Claims, 4 Drawing Figures

ORIGINAL HOLDER PLATE FOR COPYING MACHINE

BACKGROUND OF THE INVENTION

1. Field of the Invention

This invention relates to electrophotographic reproducing apparatus in which sources adapted to emit flashes of high intensity light are used for effecting an instantaneous exposure, and more particularly to a light-shielding, original-document holder for such apparatus.

2. Description of the Prior Art

Generally, in an electrophotographic reproducing apparatus wherein halogen lamps emitting relatively mild light are lit for a long period of time for effecting exposure of an original document, there is used a flat holder for the original document. In this case, if the original document is relatively thick, a gap exists between the document and the holder, light leaking from the gap when exposure is effected. Light rays through the gap are not ordinarily injurious to an operator's eyes because such light rays are not very intense. In an instantaneous exposure type electrophotographic reproducing apparatus, however, particularly those using xenon lamps which emit flashes of intense light, an operator's eyes are frequently momentarily incapacitated or might even be injured due to the light rays leaking through the gap between the relatively thick original document and the flat original-document holder, because such light rays are extremely intense.

Box-like covers for accommodating thick documents in electrophotographic copiers of the instantaneous exposure type utilizing high intensity xenon lamps are also known, but if the documents, e.g., books, are larger than the support plate upon which the documents are placed for exposure, the excess portion of the document will interfere with the cover, preventing proper closure and allowing the annoying or possibly injurious light leakage. One known solution has been to provide an interlock on the cover so as to prevent copying when the thickness of the document would preclude complete shielding by the cover. The interlock is frustrating to the operator and leads to attempts, sometimes successful, to circumvent the interlock and operate the machine, subjecting the operator to the hazard of light leakage which the interlock should prevent.

SUMMARY OF THE INVENTION

The prior art being inadequate, it is accordingly an object of the present invention to provide an original document holder suited for an electrophotographic reproducing apparatus in which an intense flash of light is used for effecting an instantaneous exposure.

The invention provides an original document holder for use in an instantaneous exposure type electrophotographic reproducing apparatus having a flash lamp below a transparent support plate for illuminating an original document located thereon, the support plate having a plurality of edges. The holder is a light-tight, box-like cover overlying the support plate and enclosing all edges thereof, the cover having a plurality of side panels; the improvement comprising means mounting at least one side panel of the cover for movement relative thereto, the one side panel being positionable to form a gap between the one side panel and a respective one edge of the support plate when an original document larger than the support plate is located thereon with a part of the document extending beyond the one edge of the support plate, the side panel resting on the extending part of the document to stop light rays from the flash lamp from passing to the outside of the cover.

BRIEF DESCRIPTION OF THE DRAWINGS

The invention will now be described in reference to the drawing, in which.

In these figures, the reference letter B designates an original document support plate, the numeral 10 designates an original document holder, the numeral 14 designates fixed side plates of holder 10, and numeral 18 designates a movable side plate of the holder.

DETAILED DESCRIPTION OF THE INVENTION

Figure 1:
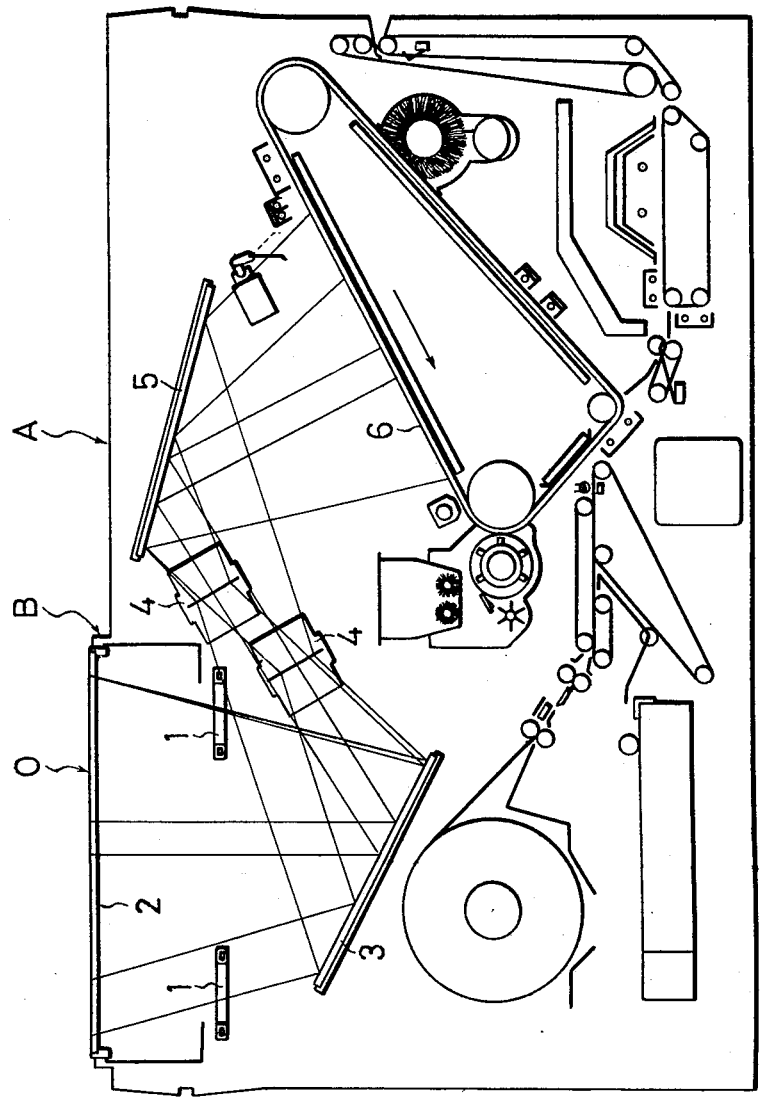
FIG. 1 is a front view schematically illustrating internal mechanisms of an electrophotographic reproducing apparatus of the instantaneous exposure type.

In general, in an electrophotographic reproducing apparatus of the instantaneous exposure type shown in FIG. 1, intense light from xenon lamps 1 passes through a glass sheet 2 of an original document support plate B to illuminate an original document 0 placed on glass sheet 2. Then, the light reflected from original document 0 is projected, via a mirror 3, a lens 4 and a mirror 5, onto the charged surface of belt-like sensitive member 6, thereby forming a latent image thereon. In this case, although emission of light from the xenon lamps 1 is instantaneous, the extreme intensity of the light rays from the xenon lamps requires complete shielding from the operator, viewed from the standpoint of safety.

Figure 3:
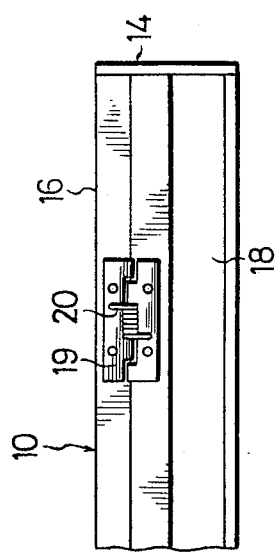
FIG. 3 is a side view of an essential part of the holder of FIG. 2.
Figure 4:
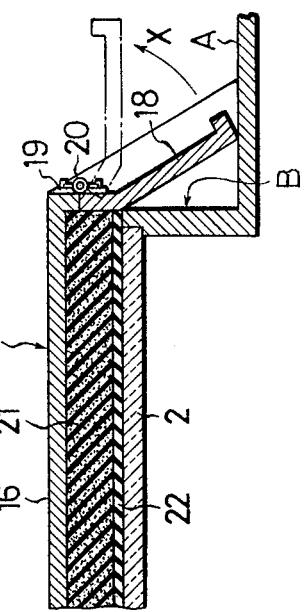
FIG. 4 is a cross-sectional view of the essential part.
Figure 2:
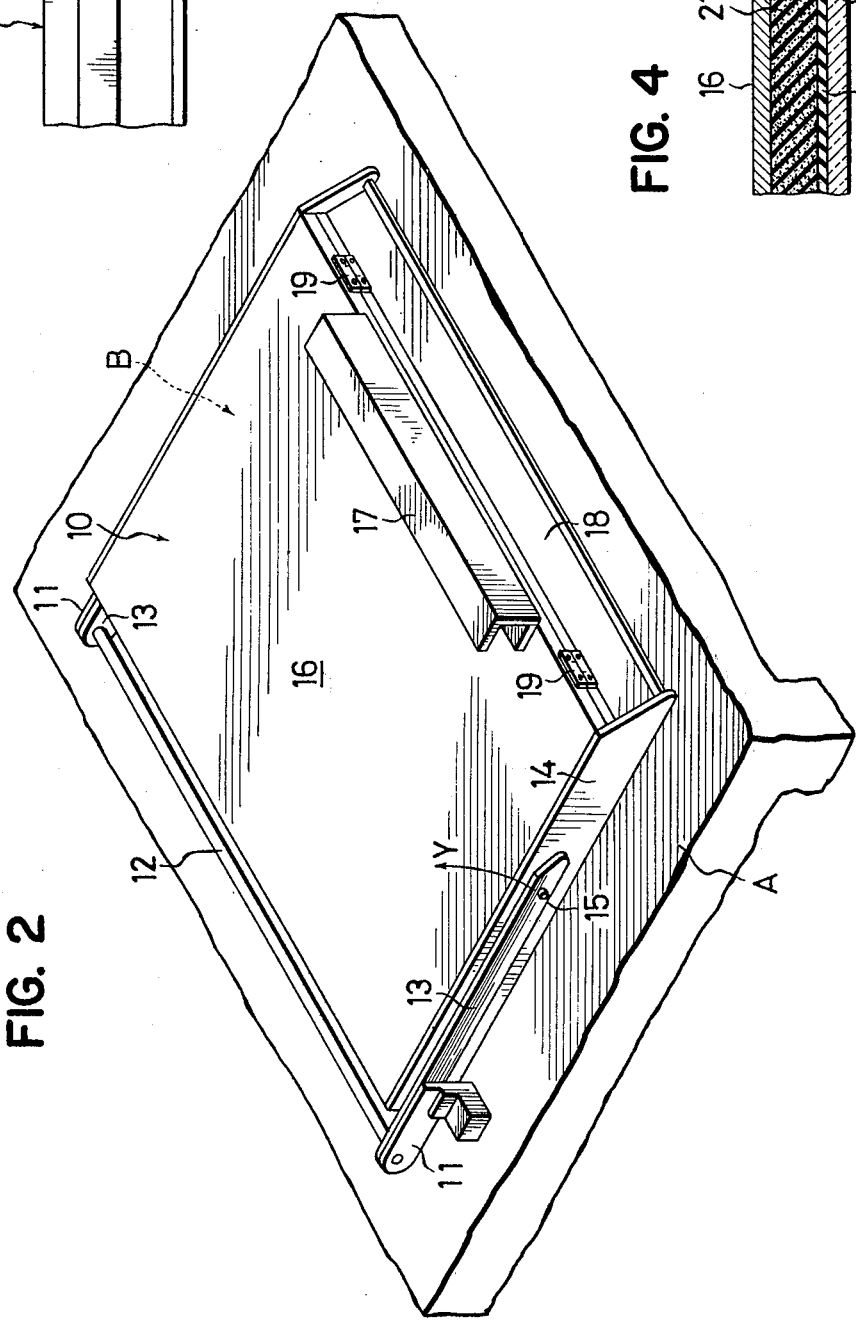
FIG. 2 is a perspective view of an original document holder according to the present invention.

The original document support plate B provided on the frame A of the reproducing apparatus has, in most cases, the aforesaid glass sheet 2 placed on the top surface thereof. According to the present invention, there is provided an original document holder 10 of a box shape so constructed as to enclose entirely the circumference of the original document support plate B, including glass sheet 2, as well as to cover entirely the upper surface thereof, as shown in FIGS. 2, 3 and 4.

A pair of brackets 11 are rigidly mounted on frame A of the reproducing apparatus. Pivotally supported by a shaft 12 spanned between the brackets 11 are a pair of attaching levers 13, each having one end thereof pivotally fastened to substantially the mid-portion of a respective one of a pair of side plates 14 of document holder 10, such that this last may be opened by rotating levers 13 in the direction of the arrow Y, i.e., counterclockwise in FIG. 2. The side plates 14 may also be termed "side panels".

A handle 17 for opening the original document holder 10 is provided on a top plate 16 forming part of holder 10, the handle being mounted opposite shaft 12 in usual fashion. A side plate 18 near handle 17 is pivotally mounted on top plate 16 by means of a pair of hinges 19 in a manner to provide a variable opening with respect to support plate B. Each hinge 19 has a closure spring 20 incorporated therein, as shown in FIGS. 3 and 4. Thus, as best seen in FIG. 4, if the original document 0 to be set on glass sheet 2 of support plate B exceeds the dimension of support plate B in the direction at right angles to shaft 12, the side plate 18 — shown in its normally closed position by the full lines in FIG. 4 — is pivotally moved in the direction of the arrow X so as to press, under the action of springs 20, the surface of that part of the original document which extends beyond support plate B.

The top of holder 10, i.e., the top plate 16, has a backing sheet 27 of a resilient, soft material — for example, urethane foam — the underside of which is bonded in known fashion to a sheet of rubber 22, such that the original document 0 on support plate B may be pressed under moderate pressure against glass sheet 2, thereby retaining original document 0 horizontal.

With the provisions of the present invention, in case a thin original document such as a sheet of paper is placed on glass sheet 2 of support plate B, the openable side plate 18 stays closed, support plate B being entirely and completely covered by holder 10, such that light from xenon lamps 1 will be perfectly shielded. On the other hand, in case a thick and large-sized original document — such as a large-sized, bulky book — is placed on glass sheet 2 of original document support plate, with part of this thick document extending beyond support plate B, the top surface of original document 0 and three sides of support plate B are covered by top plate 16 of holder 10 and the three fixed side-plates 14 thereof, respectively, while the openable side plate 18, riding on the surface of the aforesaid extending part of the thick original document 0, is pivotally moved to the position shown in phantom line in FIG. 4, against the force of springs 20, whereby the large-sized original document may be retained in place on support plate B, with the openable side plate 18 being spring-urged into light-tight contact with the surface of the projecting part of the original document 0. Thus, light from the xenon lamps 1 is completely shielded in this case also.

It will also be noted from FIGS. 2 and 4, that the side members 14 cooperating with respective ends of the movable side plate 18 may be extended somewhat beyond the point of attachment of side plate 18 to top plate 16 so that the light-shielding action may be provided even when movable side plate 18 is in the pivoted position shown in phantom line in FIG. 4.

As is apparent from the foregoing, holder 10 perfectly and light-tightly covers support plate B, irrespective of whether an original document to be reproduced is thick or thin, such that an operator may be protected from the intense light from the xenon lamps. Thus, safety of an operator is ensured while handling of the original document holder 10 is still easy, whatever document may be placed on the original document support plate. A further advantage is that since light from the xenon lamps is light-tightly shielded on the original document support plate B, all light rays emanating from the lamps are ultimately utilized in the exposure. This results from the absence of leakage of these light rays and saves a quantity of the available light for proper use.

It should be understood that the embodiment described above is merely illustrative of the principles of the invention. For instance, attachment of original document holder 10 to frame A of the apparatus is not limited to the aforedescribed bracket 11/shaft 12 combination, any suitable means being applicable. Further, two or even three of the side plates may be modified so as to move. Many other modifications may, of course, be made thereto without departure from the spirit and scope of the invention as set forth in the following claims.

What is claimed is:

1. In an instantaneous exposure type electrophotographic reproducing apparatus having a flash lamp below a transparent support plate for illuminating an original document located thereon, said support plate having a plurality of edges, and a light-tight, box-like cover overlying the support plate and enclosing all edges thereof, said cover having a plurality of side panels; the improvement comprising means mounting at least one said side panel of the cover for movement relative thereto, said one side panel being positionable to form a gap between said one side panel and a respective one edge of the support plate when an original document larger than the support plate is located thereon with a part of the document extending beyond said one edge of the support plate, the one side panel resting on said extending part of the document to stop light rays from the flash lamp from passing to the outside of the cover.

2. The apparatus of claim 1 wherein said one side panel is pivotally mounted on said cover, and further including spring means acting on the side panel to urge it toward a pivot position in which the side panel is proximate said one edge of the support plate.

3. The apparatus of claim 1 wherein an internal surface of the cover defines a plane and presses the document against the support plate, said one side panel has a lower edge, is pivotable about a horizontal axis situated above said plane, and normally rests in a position with said lower edge of the side panel situated below said plane.

4. The apparatus of claim 3 in which said document is thick and further including means for pivoting the cover relative to the support plate, adapting said internal surface of the cover for gravitational pressing engagement with said thick document, thereby maintaining a light-tight relation between the aforementioned document and said cover.

5. The apparatus of claim 3 wherein said one side panel has an inner surface proximate said one edge of the support plate, an upper portion of the side panel extends vertically downwardly from said axis to said plane and a lower portion of the side panel has said inner surface angularly oriented with respect to the panel's upper portion, whereby the side panel is pivotable to a position in which said inner surface of the lower panel portion is coplanar with said internal surface of the cover.

6. The apparatus of claim 1 further including spring means acting on the one side panel to urge it toward a pivot position in which the one side panel is proximate said one edge of the support plate.

7. The apparatus of claim 5, wherein said box-like cover includes an opposing pair of further side panels transverse to said movable side panel and having extensions in light-tight cooperation with at least said upper portion of the movable side panel when pivoted to the position wherein said inner surface of the lower panel portion is coplanar with said internal surface of the cover.

8. The apparatus of claim 7, in which said document is thick and further including means for pivoting the cover relative to the support plate, comprising a pair of levers, each having a first end journalled in brackets fastened to a surface adjacent the support plate, and each having a second end pivotally coupled to a respective one of said opposing pair of further side panels at a position near the midpoint of the respective side panel, thereby adapting said internal surface of the cover for selforienting gravitational pressing engagement with said thick document, irrespective of variations in the thickness of the document.

* * * * *

UNITED STATES PATENT AND TRADEMARK OFFICE
CERTIFICATE OF CORRECTION

PATENT NO. : 3,932,037
DATED      : January 13, 1976
INVENTOR(S) : Hiroshi Ikeda It is certified that error appears in the above-identified patent and that said Letters Patent are hereby corrected as shown below:

--[30] Nov. 17, 1973 Japan............48-132976 --.

Signed and Sealed this

Seventh Day of March 1978

[SEAL]

Attest:

RUTH C. MASON
*Attesting Officer*

LUTRELLE F. PARKER
*Acting Commissioner of Patents and Trademarks*